(No Model.) 2 Sheets—Sheet 1.

F. C. O'HARRA.
CORN CUTTING AND SHOCKING MACHINE.

No. 431,615. Patented July 8, 1890.

Witnesses
Wm H. Brereton
G. Brereton

Frank C. O'Harra Inventor

By his Attorney
J. W. Talmadge

THE NORRIS PETERS CO., PHOTO-LITHO., WASHINGTON, D. C.

(No Model.) 2 Sheets—Sheet 2.

F. C. O'HARRA.
CORN CUTTING AND SHOCKING MACHINE.

No. 431,615. Patented July 8, 1890.

Witnesses
Wm. F. Brereton
G. Brereton

Frank C. O'Harra Inventor
By his Attorney
J. W. Tallmadge

THE NORRIS PETERS CO., PHOTO-LITHO., WASHINGTON, D. C.

UNITED STATES PATENT OFFICE.

FRANK C. O'HARRA, OF PLAIN CITY, OHIO.

CORN CUTTING AND SHOCKING MACHINE.

SPECIFICATION forming part of Letters Patent No. 431,615, dated July 8, 1890.

Application filed August 16, 1889. Serial No. 321,002. (No model.)

*To all whom it may concern:*

Be it known that I, FRANK C. O'HARRA, a native citizen of the United States, residing at Plain City, in the county of Madison and State of Ohio, have invented certain new and useful Improvements in Corn-Cutting and Corn-Shocking Machines; and I do declare the following to be a full, clear, and exact description of the invention, such as will enable others skilled in the art to which it appertains to make and use the same.

My invention is a combined corn cutting and shocking machine; and the object thereof is to cut standing corn, and as such is cut to form the same into bundles or shocks; and to this end my said invention consists in certain details of construction and arrangement of the parts to accomplish the desired result, as will be hereinafter more particularly described, and illustrated in the accompanying drawings, forming a part hereof, and in which drawings—

Figure 1:
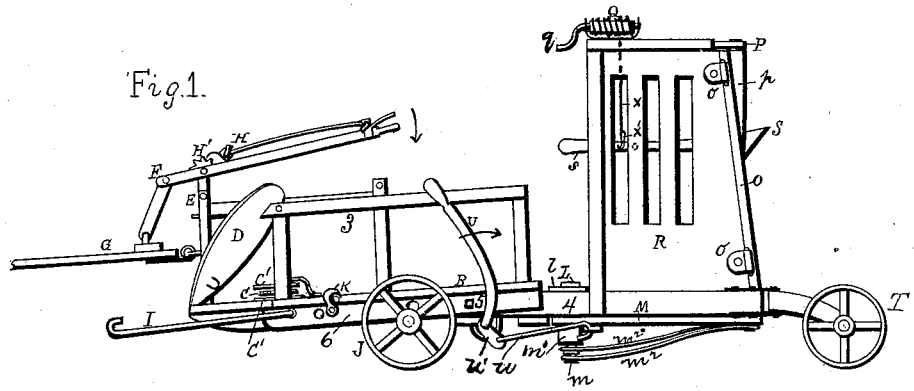
Figure 5:
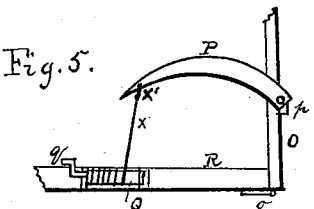
Figure 2:
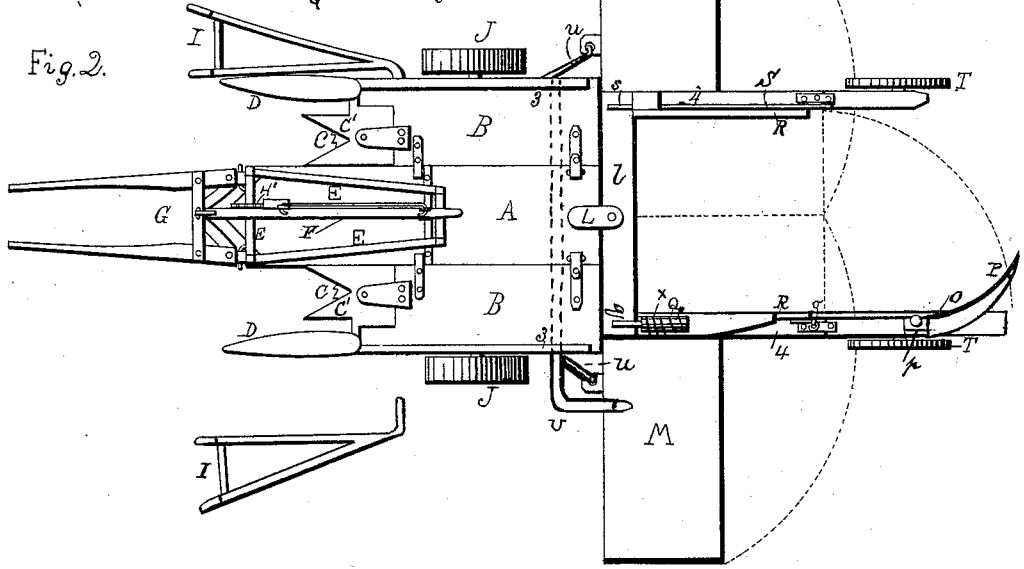
Figure 3:
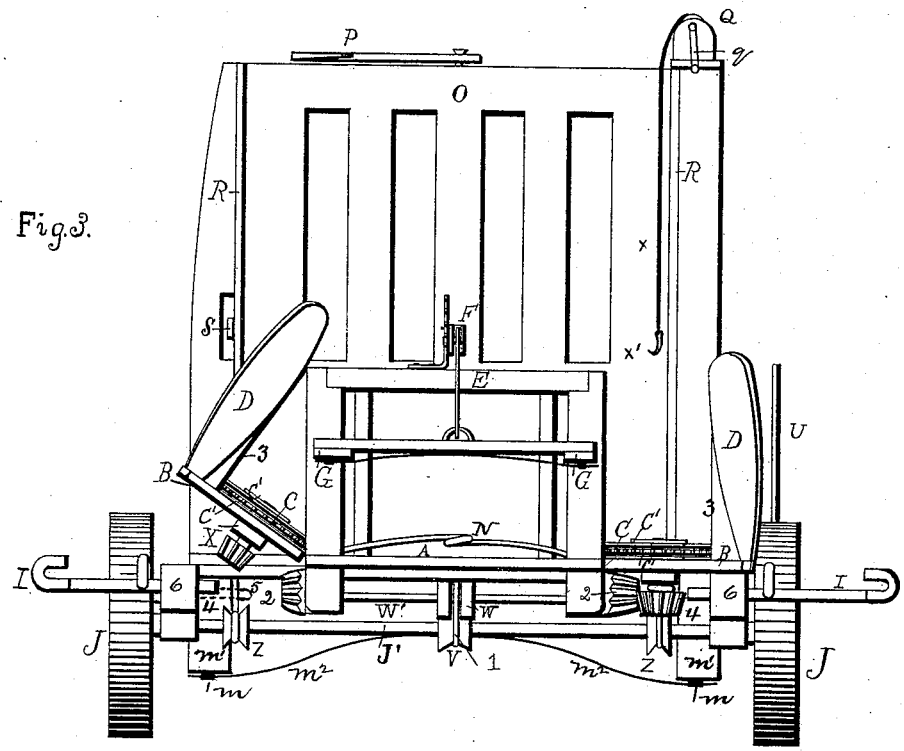

Figure 1 represents a view in side elevation of a combined corn cutting and shocking machine constructed according to my invention, and Fig. 2 a plan view of the same. Fig. 3 represents a front elevation, and Fig. 4 a view of the under surface of the machine. Fig. 5 is a detail view in plan of a portion of the rear end of the shocker, illustrating the operation of the binder or compressing-hook.

Similar letters and figures of reference designate like parts in the several views.

In carrying out my invention I proceed as follows: The machine is composed of two main parts—the cutter and the shocker—that are adjustably secured together for the purposes as will hereinafter appear.

The machine is designed to cut one or two rows of standing corn and to be worked by one, two, or more horses and to be operated by two men that ride upon the machine.

The cutter is composed of a suitable frame or platform A, mounted upon wheels J, at each side of which platform are hinged wings B, that carry at their forward ends revolving cutters or knives C, that operate between guards or finger-bars C'. These hinged wings B are secured in place by hooks K, and motion is imparted to the knives C by band Y, Fig. 4, that passes around a pulley X on the lower end of the shaft of the revolving cutters C and a pulley Z on the driving-shaft J' of the wheels J. In addition to this the cutters also receive motion from the drive-shaft J' by a band 1, passing over a pulley V on said drive-shaft and over a pulley W on a shaft W', at whose extremities are mounted bevel gear-wheels 2, that mesh with a similar gear-wheel on the lower end of the shaft of the cutter.

Projecting forward of the cutters C are guides D, for directing the corn to the cutters, and at each side of the cutter-frame, on the outside edges of the wings, is arranged a frame 3, that tends to hold the corn in its upright position after being cut and as it passes to the shocker.

The letter G indicates the shafts for the attachment of a horse, and at each side of the cutter-frame is removably attached a bracket-frame I, to which additional horses may be hooked, if necessary.

E is a frame similar to the frame 3 and for the same purpose—that of holding the cut corn in an upright position—and to the forward end of this frame E is mounted a hand-lever F, whose lower end is connected to the rear of the shafts G, for the purposes as will presently appear. Attached to this hand-lever F is the usual bolt H, operating in connection with a segment H' for the purpose of holding the lever in its adjusted position.

This completes the description of the cutting portion of the apparatus. Turning now to the shocker, the same is composed of a suitable supporting-frame 4, removably and pivotally secured to the cutter-frame by bolts 5, that pass through the frame 4 and side bars 6 of the cutter-frame, as shown in Fig. 4, whereby said shocker is pivotally secured to the cutter-frame, and said shocker-frame may assume an angle relative to said cutter-frame, as in Fig. 1, or be retained in a horizontal position by a button L, fixed upon a cross-piece *l* of the shocker-frame and engaging upon the top of the platform A, as shown in Fig. 2.

Figure 4:
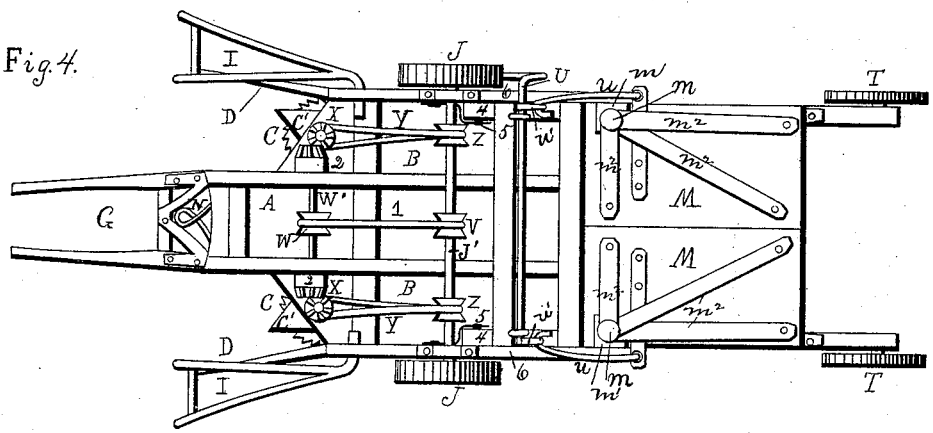

M M indicate the bottom of the shocker, that is in two sections, each of which is pivoted at *m*, Fig. 4, to the side pieces of the shocker-frame and connected by a rod *u*. To each section of said bottom is a hand-lever U, whereby said bottom may be swung open, as in Fig. 2—that is to say, by pressing the lever U backward in the direction of the arrow in Fig. 1 the crank-arm $u'$ of said lever is forced toward the front of the machine, and through the rod $u$, connected to said arm $u'$ and to the bottom sections M, said bottom sections are swung open, as in Fig. 2.

R R are the sides of the shocker, which are of suitable height to extend near the top of the corn, and to the back of which sides is hinged, as at $o$, a door or gate O, which gate is secured in its closed position by a latch S, that is pivoted along one of the sides R, and is provided with a handle at the front edge of said side, as at $s$, Fig. 1.

The rear end of the shocker is supported on caster-wheels T, and at the top of said shocker is arranged a binder P, by which the corn may be compressed into compact bundles and then secured by cord or otherwise. The binder-hook P is pivoted to an upright piece $p$, that in turn is secured to the back of the door O about midway of its width.

The operation is as follows: If the machine is to be used with one horse and to cut but a single row of corn, the brackets I are removed and one of the wings B turned up, as shown upon the left of Fig. 3, the belt Y, connecting the cutter of such wing with the driving-axle, having first been removed. The machine is then drawn along, and as the wheels J revolve the axle $J'$ thereof is turned, and through the connections X Y Z the cutters C are revolved, and as they are brought against the corn it is cut, and then said corn passes along the wings B, being assisted by one or two attendants upon the platform, and thence into the shocker. After sufficient corn has been cut to form a shock of the desired size the top ends of the corn are compressed by the binder P and then secured by a cord or otherwise. To compress the corn into a compact shock, a hook $x'$, secured to one end of a rope $x$, which rope is wound upon a drum Q, that is mounted upon the top edge on one side of the shocker, is hooked into an eye in the outer end of the binder-hook P. Then by operating the crank-handle $q$ of the drum Q the rope $x$ is wound upon said drum and the hook P drawn toward one side of the shocker, as shown in Fig. 5, and the corn thereby compressed. When sufficiently compressed, a cord or other material is passed around the shock and the same permanently secured, after which the hook $x'$ is detached from the binder-hook P and assumes the position shown in Fig. 3. The catch S is now lifted by pressing down on handle $s$, and at the same time the lever U is pressed backward, whereupon the floor opens, as in Fig. 2, depositing the shock in its standing position upon the ground, and the door O being released from its catch the shock is permitted to pass out of the shocker.

When desired to cut the corn very close to the ground, the button L is turned back and the lever F depressed in the direction of the arrow in Fig. 1, when the front end of the cutter-frame will be brought near the ground and the rear end slightly elevated, as in Fig. 1. When designed to cut two rows of corn, both wings B remain in place and two or more horses are used.

As before stated, the bottom of the shocker is in two sections M M, and these sections are secured to the shocker by a pivot-bolt $m$, that extends up through a short post $m'$, projecting from the under side of the outer front corner of the bottom sections, and thence said bolt passes through and is held by the side frames 4 of the shocker. Extending from the bottom of the post $m'$ to the outer corners of the sections M M are brace-rods $m^2$, for supporting the bottom in its horizontal position.

If desired, when both cutters are in use, the belts Y may be disconnected and the cutters simply driven by the bevel-gears; but when but one cutter is used the belts are preferred.

When but a single horse is used to draw the machine, he is hitched in the shafts G, and the singletree attached to the clevis N, that is permanently fixed to the front of the platform A.

I claim and desire to secure by Letters Patent—

1. In a combined corn cutting and shocking mechanism, in combination with the platform A, mounted upon wheels J, wings B B, hinged at each side of said platform A, and cutters C C, mounted at the front end of the wings, with suitable connections for revolving said cutters from the shaft of the supporting-wheels J, and the shocker pivotally united to the rear end of frame A and supported at its rear upon wheels T T, and having a hinged rear door O and twin-section bottom M M, as described and shown, for the purposes specified.

2. In combination with the cutter-frame, the shocker removably pivoted to said frame and composed of vertical sides R R, rear door O, hinged at one side to one of the sides R and having a locking-latch S, and twin-section bottom M M, pivoted at $m$ to the frame, and hand-lever U, with crank-arm $u'$ and rod $u$, substantially as described, for the purposes specified.

3. In combination with the shocker composed of vertical sides R R, rear door O, hinged at one side to one of the sides R, and twin-section bottom M M, pivoted to the frame and adapted to swing outward, the binder-hook P, arranged at the top edge of the door O, and roller Q, arranged upon the top edge of the side R, substantially as described, for the purposes specified.

4. The combination, with the platform A and shocker-frame 4, pivotally secured by bolts 5 to each other, and cross-piece $l$ of said shocker-frame, of the button L, for holding said cutter, platform, and shocker-frame in a horizontal position, as described.

5. The combination, with the platform A, hinged wings B B, and revolving cutters C C, mounted at the front end of said wings, of the driving-shaft J', pulleys Z Z and V, mounted on said shaft, shaft W', carrying pulley W and bevel-gears 2 2, pulleys X X and bevel-gears on the lower end of the cutter-shafts, and bands Y Y and 1, all constructed and arranged to operate substantially as and for the purposes described.

In testimony whereof I have affixed my signature in presence of two witnesses.

FRANK C. O'HARRA.

Witnesses:
HOWARD BLACK,
F. B. MILLIGAN.